(12) United States Patent
Tanabe et al.

(10) Patent No.: US 8,175,633 B2
(45) Date of Patent: May 8, 2012

(54) WIRELESS COMMUNICATION APPARATUS, SYSTEM, METHOD, AND PROGRAM

(75) Inventors: Yasuhiko Tanabe, Kawasaki (JP); Tsuguhide Aoki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 371 days.

(21) Appl. No.: 12/472,839

(22) Filed: May 27, 2009

(65) Prior Publication Data

US 2009/0296656 A1    Dec. 3, 2009

(30) Foreign Application Priority Data

May 28, 2008 (JP) ................................. 2008-139551

(51) Int. Cl.
*H04M 1/00* (2006.01)
(52) U.S. Cl. .................. 455/550.1; 455/561; 455/553.1; 370/334
(58) Field of Classification Search ............... 455/550.1, 455/561, 553.1; 370/334
See application file for complete search history.

(56) References Cited

U.S. PATENT DOCUMENTS

| | | | | |
|---|---|---|---|---|
| 2005/0041615 | A1* | 2/2005 | Hayashi et al. | 370/328 |
| 2005/0186912 | A1* | 8/2005 | Nakao et al. | 455/67.11 |
| 2006/0083202 | A1* | 4/2006 | Kent et al. | 370/334 |
| 2006/0203760 | A1* | 9/2006 | Fukui et al. | 370/328 |
| 2007/0184863 | A1* | 8/2007 | Takagi et al. | 455/507 |
| 2007/0224930 | A1* | 9/2007 | Fukui et al. | 455/3.05 |
| 2010/0167752 | A1* | 7/2010 | Kojima | 455/452.2 |
| 2010/0173592 | A1* | 7/2010 | Yamazaki et al. | 455/69 |

OTHER PUBLICATIONS

Hochwald, et al., "*A Vector-Perturbation Technique for Near-Capacity Multiantenna Multiuser Communication—Part II: Perturbation*"; IEEE Transactions on Communications, vol. 53, No. 3, Mar. 2005, pp. 537-544.

* cited by examiner

*Primary Examiner* — Danh Le
(74) *Attorney, Agent, or Firm* — Ohlandt, Greeley, Ruggiero & Perle, L.L.P.

(57) ABSTRACT

A wireless communication apparatus includes a first storage unit configured to store each of a plurality of upper limit values of absolute values of additional signals that are set for a corresponding one of a plurality of first wireless communication apparatuses and are added when a plurality of modulation symbols to be transmitted to the first wireless communication apparatuses are precoded, a coding unit configured to decide each of a plurality of first values of the additional signals for a corresponding one of the first wireless communication apparatuses within ranges defined by the upper limit values, and precode the modulation symbols using the first values to obtain a plurality of transmission signals, and a first transmission unit configured to transmit, using multi-user MIMO (Multiple Input Multiple Output), the transmission signals to the first wireless communication apparatuses.

17 Claims, 5 Drawing Sheets

| Class 1 | Modulation scheme : BPSK, QPSK, 16QAM, 64QAM, Coding scheme : Turbo code, Convolution code Coding ratio : 1/2, 2/3, 3/4, 5/6, 7/8 Stream count maximum value : 4 Precoding maximum value : 4 |
|---|---|
| Class 2 | Modulation scheme : BPSK, QPSK, 16QAM, Coding scheme : Turbo code, Convolution code Coding ratio : 1/2, 2/3, 3/4, 5/6 Stream count maximum value : 2 Precoding maximum value : 1 |
| Class 3 | Modulation scheme : BPSK, QPSK, 16QAM, Coding scheme : Convolution code Coding ratio : 1/2, 2/3, 3/4 Stream count maximum value : 2 Precoding maximum value : 0 |

F I G. 7

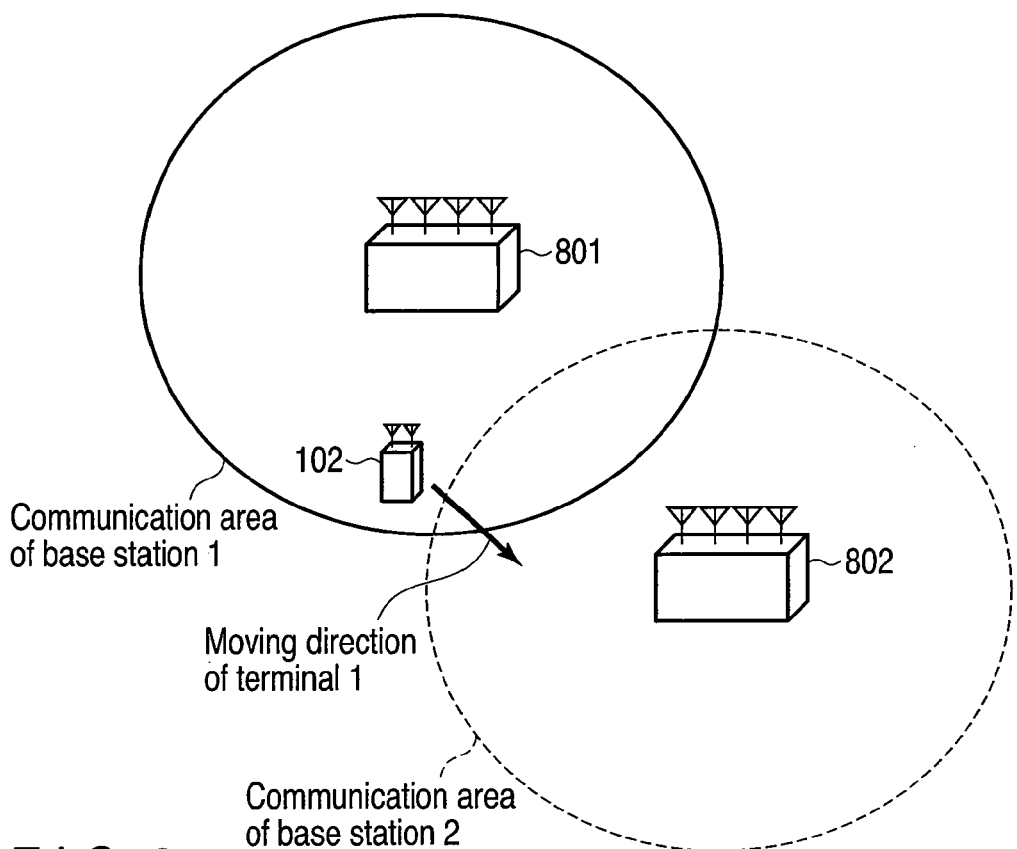

F I G. 8

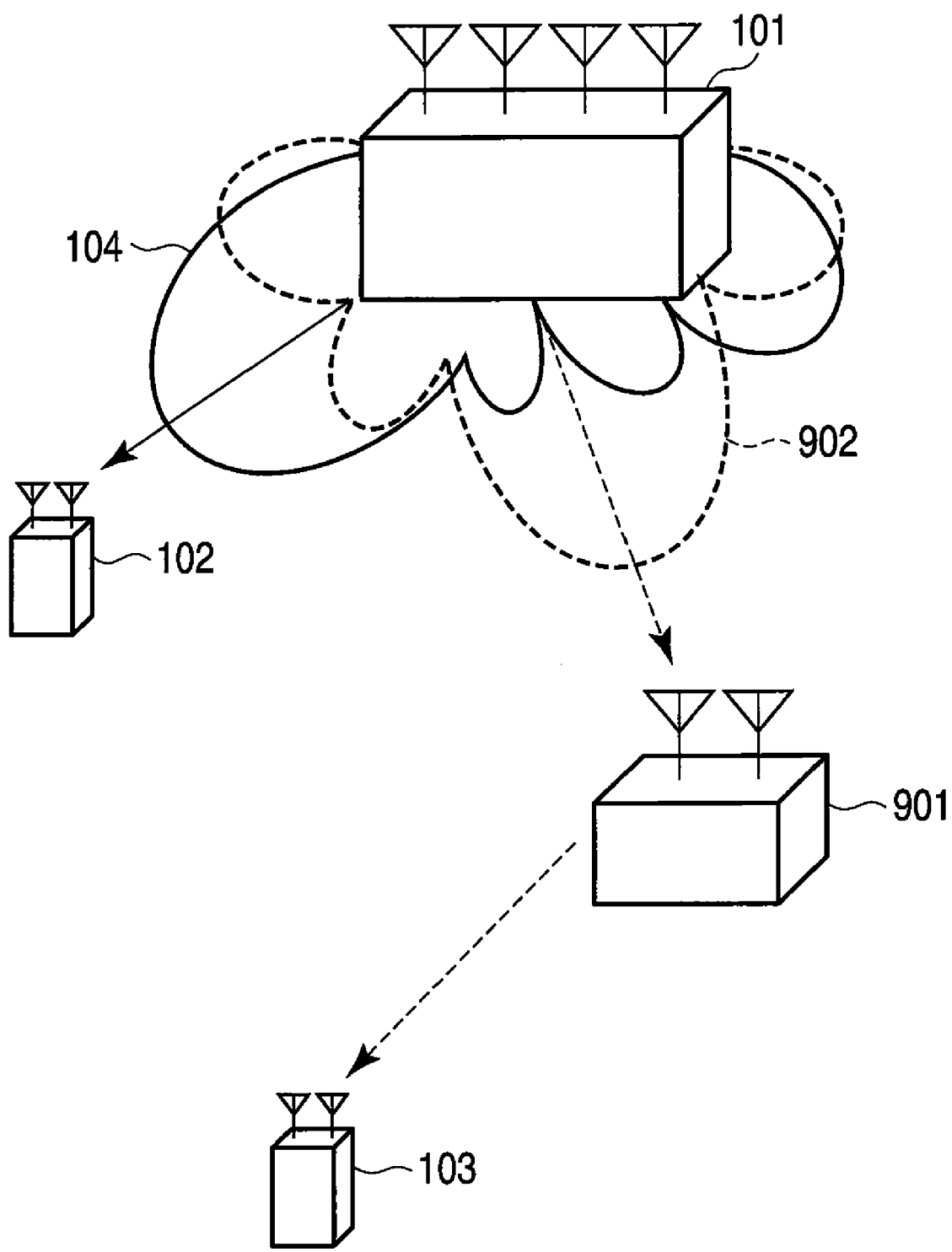
F I G. 9

WIRELESS COMMUNICATION APPARATUS, SYSTEM, METHOD, AND PROGRAM

CROSS-REFERENCE TO RELATED APPLICATIONS

This application is based upon and claims the benefit of priority from prior Japanese Patent Application No. 2008-139551, filed May 28, 2008, the entire contents of which are incorporated herein by reference.

BACKGROUND OF THE INVENTION

1. Field of the Invention

The present invention relates to a wireless communication apparatus, system, method, and program using multi-user MIMO transmission that adopts preceding.

2. Description of the Related Art

A MIMO (Multiple Input Multiple Output) transmission method is known as a technique of increasing the channel capacity of wireless communications by causing each of transmitters and receivers to perform transmission/receiving using a plurality of antennas and a plurality of radio units.

The MIMO transmission can increase the channel capacity in accordance with the number of antennas and radio units of transmitters and receivers. However, for example, a portable compact terminal can have only a limited number of antennas and radio units in view of its size and power consumption. This hinders the channel capacity from unlimitedly increasing, so restrictions on the device arrangement limit the channel capacity.

A transmission method called multi-user MIMO or SDMA (Spatial Division Multiple Access) is known, which communicates with a plurality of wireless apparatuses simultaneously using a single frequency. In the multi-user MIMO, the antennas and radio units of wireless apparatuses communicating simultaneously virtually form MIMO channels using a lot of antennas and radio units. For this reason, even when each wireless apparatus has only a limited number of antennas and radio units, a large channel capacity is available.

Methods of multiplexing a plurality of wireless apparatuses using multi-user MIMO in downlink channels from a base station or an access point to wireless communication terminals can roughly be classified into two types: methods using only beamforming and methods using both beamforming and preceding. Examples of multiplexing using only beamforming are methods of dividing space using a plurality of sector antennas having different directivities and causing them to communicate with different wireless communication terminals, and methods of adaptively forming beams for respective wireless communication terminals using an adaptive array and multiplexing the plurality of beams. The multiplexing methods using only beamforming are almost the same as transmission techniques using single-user MIMO transmission except that the signals of different wireless communication terminals are transmitted at the same frequency in the same time. Additionally, receiving can be done using the same scheme as in single-user MIMO transmission. This easily implements multi-user MIMO transmission. However, the multiplexing using only beamforming is significantly affected by correlation of propagation paths between the wireless communication terminals. If the correlation is high because of, e.g., wireless communication terminals in close vicinity, the performance considerably degrade. To the contrary, the methods using preceding together adopt coding according to modulation symbols (e.g., R. F. H. Fischer, C. Windpassinger, A. Lamper, and J. B. Huber, "MIMO preced-ing for decentralized receivers", In proc. ISIT 2002, Lausanne, Switzerland, June 2002.; B. M. Hochwald, C. B. Peel, and A. Lee Swindlehurst, "A vector perturbation technique for near-capacity multiantenna multiuser communication—part II: perturbation", IEEE Trans. Commun. vol. 53, No. 3, pp. 537-544, March 2005). Although the operation load in transmission is heavy, these methods are hardly influenced by correlation of propagation paths between terminals. It is therefore possible to obtain an outstanding channel capacity increasing effect by multiplexing as compared to multiplexing by only beamforming.

However, when Tomlinson-Harashima preceding in R. F. H. Fischer, C. Windpassinger, A. Lamper, and J. B. Huber, "MIMO preceding for decentralized receivers", In proc. ISIT 2002, Lausanne, Switzerland, June 2002 or vector perturbation in B. M. Hochwald, C. B. Peel, and A. Lee Swindlehurst, "A vector perturbation technique for near-capacity multiantenna multiuser communication—part II: perturbation", IEEE Trans. Commun. vol. 53, No. 3, pp. 537-544, March 2005 is applied as a preceding scheme, the position of the constellation point of a signal to be received by a receiver may shift due to the influence of a signal added by preceding. For this reason, the digital signal processing unit of the receiver needs to have a wider dynamic range than that in a traditional receiver without preceding, resulting in an increase in the device scale and power consumption.

As described above, a large device scale and high power consumption pose problems in the conventional wireless communication apparatus. There are also challenges to higher system throughput, shorter waiting time, smaller crest factor of transmission signals, and improved coverage that enables communication at a predetermined throughput or more (reduction of dead zones).

BRIEF SUMMARY OF THE INVENTION

According to an aspect of the invention, there is provided a wireless communication apparatus comprising: a first storage unit configured to store each of a plurality of upper limit values of absolute values of additional signals that are set for a corresponding one of a plurality of first wireless communication apparatuses and are added when a plurality of modulation symbols to be transmitted to the first wireless communication apparatuses are precoded; a coding unit configured to decide each of a plurality of first values of the additional signals for a corresponding one of the first wireless communication apparatuses within ranges defined by the upper limit values, and precode the modulation symbols using the first values to obtain a plurality of transmission signals; and a first transmission unit configured to transmit, using multi-user MIMO (Multiple Input Multiple Output), the transmission signals to the first wireless communication apparatuses.

According to another aspect of the invention, there is provided a wireless communication apparatus comprising: a second storage unit configured to store each of a plurality of upper limit values of absolute values of additional signals to be added upon preceding, each of the upper limit values defining a corresponding one of ranges each indicating constellation points corresponding to receivable signals; and a second transmission unit configured to transmit, before a second wireless communication apparatus transmits a plurality of signals to a plurality of first wireless communication apparatus using multi-user MIMO (Multiple Input Multiple Output), a corresponding one of the upper limit values to the second wireless communication apparatus.

According to yet another aspect of the invention, there is provided a wireless communication system including a plurality of first wireless communication apparatuses and a second wireless communication apparatus, each of the first wireless communication apparatuses comprising: a second storage unit configured to store an upper limit value of an absolute value of an additional signal to be added when a modulation symbol to be transmitted from the second wireless communication apparatus to each of the first wireless communication apparatuses is precoded, the upper limit value defining a range indicating constellation points corresponding to receivable signals; and a second transmission unit configured to transmit, before the second wireless communication apparatus transmits a plurality of signals to the first wireless communication apparatus using multi-user MIMO (Multiple Input Multiple Output), the upper limit value to the second wireless communication apparatus, and the second wireless communication apparatus comprising: a first receiving unit configured to receive the upper limit value corresponding to each of first wireless communication apparatuses to obtain each of a plurality of upper limit values for a corresponding one of first wireless communication apparatuses; a first storage unit configured to store the upper limit values; a coding unit configured to decide each of a plurality of first values of additional signals for a corresponding one of the first wireless communication apparatuses within ranges defined by the upper limit values, and precode, using the first values, modulation symbols to be transmitted to the first wireless communication apparatuses to obtain a plurality of transmission signals; and a first transmission unit configured to transmit, using multi-user MIMO (Multiple Input Multiple Output), the transmission signals to the first wireless communication apparatuses.

BRIEF DESCRIPTION OF THE SEVERAL VIEWS OF THE DRAWING

FIG. 7 is a table showing classes representing the communication parameters of wireless communication terminals;

FIG. 8 is a view for explaining handover according to the third embodiment; and

FIG. 9 is a view showing a wireless communication system according to the fourth embodiment, which includes a relay station and uses multi-user MIMO transmission.

DETAILED DESCRIPTION OF THE INVENTION

Figure 1:
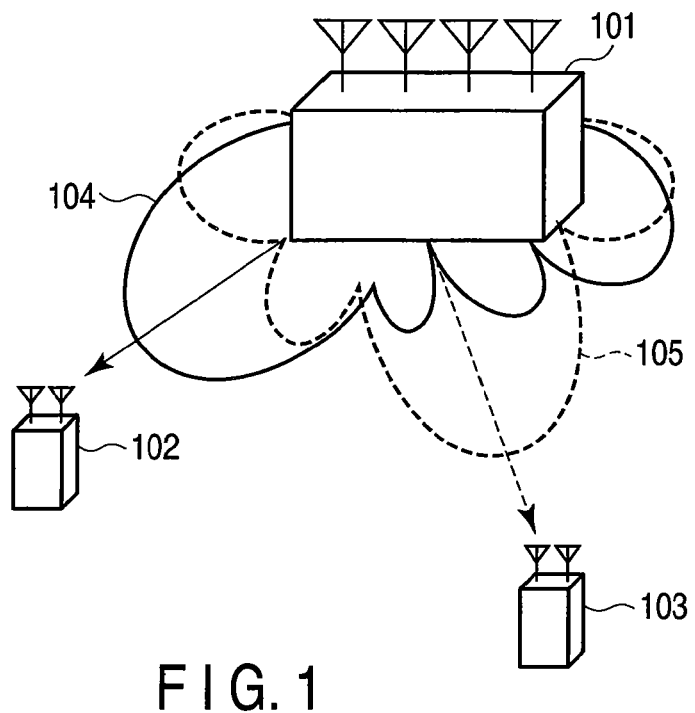
FIG. 1 is a view showing a wireless communication system according to an embodiment, which includes a wireless base station and two wireless communication terminals and uses multi-user MIMO transmission.

A wireless communication apparatus, system, method, and program according to embodiments of the present invention will now be described in detail with reference to the accompanying drawing. In the following embodiments, parts given the same reference numerals perform the same operations, and a repetitive description thereof will be omitted. Note that a wireless communication apparatus indicates a wireless communication terminal or a base station.

In a wireless communication system using only a specific frequency channel, a wireless communication terminal generally receives, upon power-on, a broadcast signal or a signal called a beacon transmitted from a wireless communication apparatus such as a base station or an access point which is already performing communication using the frequency channel. In a system capable of using a plurality of frequency channels, a wireless communication terminal searches the frequency channels for a frequency channel currently used for communication, and then receives a broadcast signal or a beacon transmitted via the frequency channel.

After recognizing the communication partner in this way, the wireless communication terminal transmits a connection request frame and establishes connection. In the embodiments of the present invention, the wireless communication terminal at this time notifies the communication partner (e.g., the base station or access point) of the upper limit value of the absolute value of a signal which is to be added by precoding and is receivable by the wireless communication terminal itself. Note that precoding and the upper limit value of the absolute value to be sent here will be described later in detail in association with precoding of multi-user MIMO.

The upper limit value of the absolute value can be transmitted either in the same frame as the connection request frame or in another frame after the connection request frame transmission and connection establishment. The notification can be done at any timing before transmission of a signal of multi-user MIMO using precoding.

A case will be described next with reference to FIG. 1, in which a base station transmits signals to a plurality of wireless communication terminals using multi-user MIMO transmission. As shown in FIG. 1, a base station 101 forms different beams for wireless communication terminals 102 and 103 and transmits signals. More specifically, the base station 101 forms a beam 104 directed to terminal 1 for the wireless communication terminal 102, and a beam 105 directed to terminal 2 for the wireless communication terminal 103.

FIG. 1 illustrates an example in which the base station forms only one beam for each wireless communication terminal, and transmits only one signal to each wireless communication terminal. However, the number of multiplexed signals for each wireless communication terminal is not limited to one. The base station may assign a plurality of different beams to each wireless communication terminal and transmit different signals multiplexed by the beams.

According to the wireless communication apparatus, system, method, and program of the present invention, it is possible to increase the channel capacity without requiring an excess device scale or power consumption.

(First Embodiment)

A transmitter of this embodiment will be described with reference to FIG. 2. The transmitter in FIG. 2 is included in, e.g., a base station 101.

Figure 2:
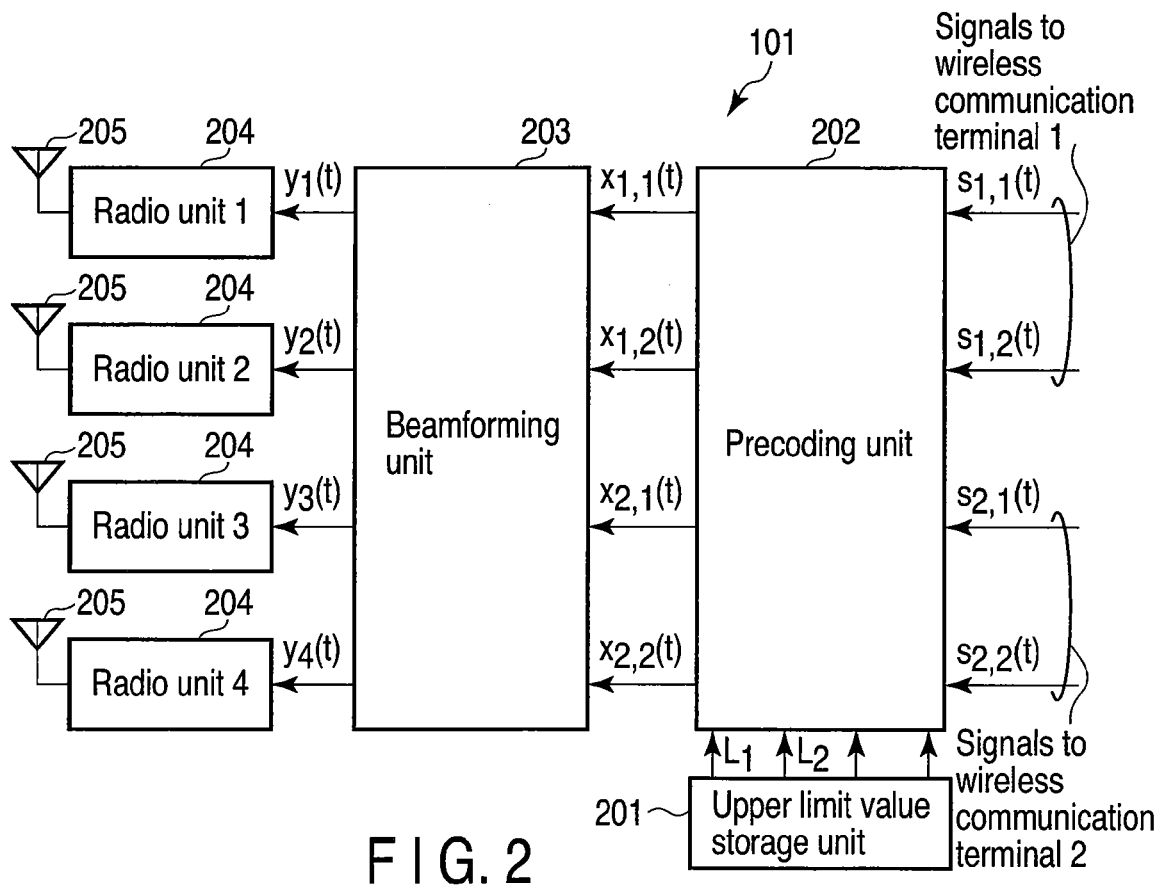
FIG. 2 is a block diagram of the base station in FIG. 1.

The base station 101 includes an upper limit value storage unit 201, precoding unit 202, beamforming unit 203, radio units 1 to 4 204, and antennas 205 (four in the example of FIG. 2). These device components will be explained below.

The precoding unit 202 receives modulation symbols to be transmitted to the wireless communication terminals, precodes them, and transfers the precoded transmission signals (multiplexed signals) to the beamforming unit 203. A multiplexed signal $x_{k,d}(t)$ represents a dth multiplexed signal for a kth wireless communication terminal. In FIG. 2, the precoding unit 202 receives modulation symbols $s_{1,1}(t)$ and $s_{1,2}(t)$ for the wireless communication terminal 1 102, and modulation symbols $s_{2,1}(t)$ and $s_{2,2}(t)$ for the wireless communication terminal 2 103, precodes them, and transfers multiplexed signals $x_{1,1}(t)$, $x_{1,2}(t)$, $x_{2,1}(t)$, and $x_{2,2}(t)$ to the beamforming unit 203. The operation of the preceding unit 202 will be described later in detail with reference to Expression (5) and the like.

The beamforming unit 203 receives the multiplexed signals $x_{k,d}(t)$ for the wireless communication terminals, multiplies them by transmission weight vectors $v_{k,d}$, and transfers transmission signals $y_1(t)$ to $y_4(t)$ corresponding to the antennas 205 to the radio units 1 to 4 204 corresponding to the antennas 205. The radio units 1 to 4 204 perform transmission processing of the transmission signals $y_1(t)$ to $y_4(t)$, and transmit them from the antennas 205.

The transmission signals transferred from the beamforming unit 203 to the radio units 1 to 4 204 will be described in detail. Let $x_{k,d}$ be the dth multiplexed signal for the kth wireless communication terminal, and $v_{k,d}$ be the transmission weight vector by which each transmission antenna is to be multiplied when transmitting $x_{k,d}$. In multi-user MIMO, the base station transmits a signal given by $$y(t) = \sum_{k=1}^{K} \sum_{d=1}^{D_k} v_{k,d} \cdot x_{k,d}(t) \quad (1)$$

where K is the number of wireless communication terminals which simultaneously communicate in the multi-user MIMO, and $D_k$ is the number of streams to be multiplexed and transmitted to the kth wireless communication terminal. Without application of preceding, $x_{k,d}(t)$ equals a modulation symbol $s_{k,d}(t)$.

$$x_{k,d}(t) = s_{k,d}(t) \quad (2)$$

Note that the transmission weight vectors are usable by any method if all of them form a linearly independent combination.

An example of the transmission weight vector is a scheme called Block Diagonal which forms null in signals for wireless communication terminals other than a desired one. Using a propagation path matrix $H_n$ including, as the elements of i rows and j columns, the propagation path response between the jth antenna of the base station and the ith antenna of the nth wireless communication terminal, the Block Diagonal uses, as the transmission weight vector of the kth wireless communication terminal, a weight vector that satisfies $$H_n [v_{k,1} \ v_{k,2} \ldots v_{k,D_k}] = 0_{M_n, D_k}, (\forall n \neq k) \quad (3)$$

where $M_n$ is the number of antennas of the nth wireless communication terminal.

Hence, the vectors of the kernel space of the propagation path response that couples the propagation path matrices of all wireless communication terminals except the desired one are used as the transmission weight vectors, which are represented by $$[H_1^T H_2^T \ldots H_{k-1}^T H_{k+1}^T H_{k+2}^T \ldots H_K^T]^T \quad (4)$$

where T is the transpose of the matrix.

All the transmission weight vectors may be normalized to have a predetermined norm and uniform the transmission powers. The normalization may be done in accordance with the number of streams of each wireless communication terminal to uniform the transmission powers to the wireless communication terminals. Alternatively, different norms may be set for the transmission weight vectors, and transmission power control may be applied.

A preceding scheme of the embodiment when transmitting signals to wireless communication terminals using the above-described weights will be explained next.

Figure 3:
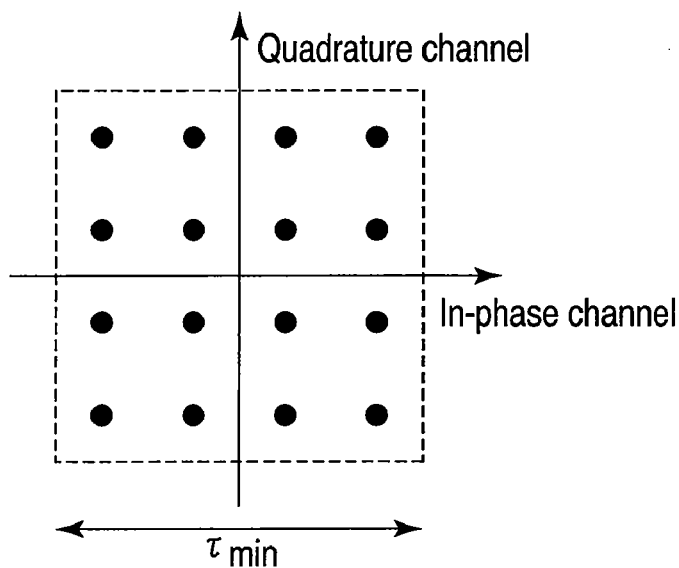
FIG. 3 is a view showing the modulation points of 16-QAM.

Except when the transmission weight vectors are orthogonal to each other, the transmission signal power represented by Expression (1) changes depending on the modulation symbol and never has a predetermined value for all modulation symbols. In this case, a signal is added in accordance with a modulation symbol to minimize the transmission power. In the embodiments of the present invention, manipulating a signal in accordance with a modulation symbol will be referred to as preceding. The transmission signal of the dth stream for the kth wireless communication terminal after application of preceding is given by $$x_{k,d}(t) = s_{k,d}(t) + \tau(l_{k,d}^{(r)}(t) + j l_{k,d}^{(i)}(t)) \quad (5)$$

where $l_{k,d}^{(r)}(t)$ and $l_{k,d}^{(i)}(t)$ are integer values, and j is the imaginary unit ($j^2 = -1$). In addition, $\tau$ is a real number larger than $\tau_{min}$ shown in FIG. 3, which needs to be known in advance between a transmitter and a receiver. FIG. 3 illustrates the modulation points of 16-QAM as examples of modulation symbols. The value $\tau$ can either change depending on the modulation scheme or be the same. The value $\tau$ can be any value as far as it is preset and known between the transmitter (base station 101) and the receivers (wireless communication terminal 1 102 and wireless communication terminal 2 103) and is larger than $\tau_{min}$ that is determined for each modulation scheme.

The preceding unit 202 of the base station 101 decides $l_{k,d}^{(r)}(t)$ and $l_{k,d}^{(i)}(t)$ to minimize a transmission signal power p given by $$p = \|y(t)\|^2 = y^H(t) y(t) \quad (6)$$

$$l_{k,d}^{(r)}(t) = \arg \min_{l_{k,d}^{(r)}(t)} \|y(t)\| \quad (7)$$

$$l_{k,d}^{(i)}(t) = \arg \min_{l_{k,d}^{(i)}(t)} \|y(t)\| \quad (8)$$

Figure 4:
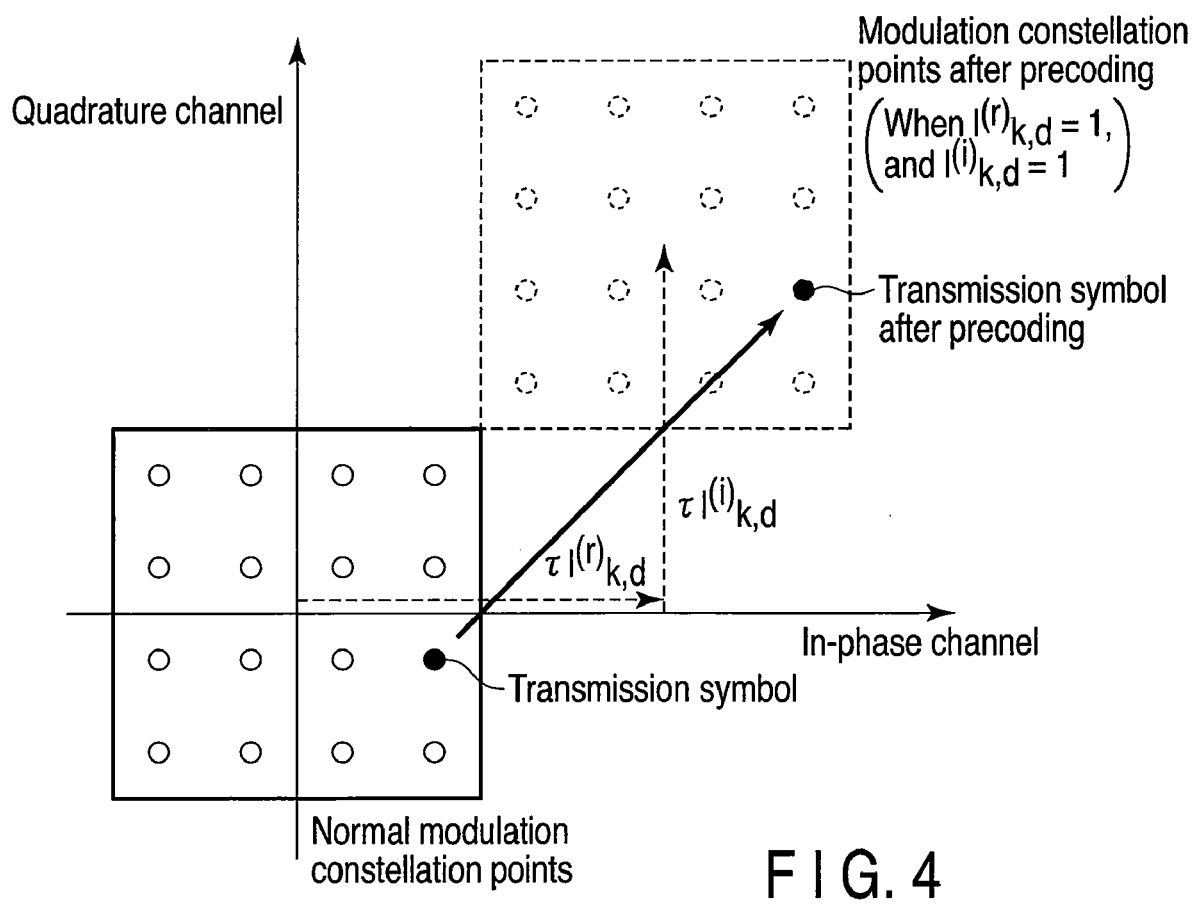
FIG. 4 is a view showing a modulation symbol and modulation constellation points after precoding.

FIG. 4 shows a precoded transmission signal when $l_{k,d}^{(r)}(t) = 1$, and $l_{k,d}^{(i)}(t) = 1$. Precoding application changes the modulation constellation points to those about a position shifted in accordance with $l_{k,d}^{(r)}(t)$ and $l_{k,d}^{(i)}(t)$.

The preceding unit 202 calculates the magnitudes of $l_{k,d}^{(r)}(t)$ and $l_{k,d}^{(i)}(t)$ for each wireless communication terminal and each multiplexed signal to minimize the transmission power based on Expressions (6), (7), and (8).

In the prior arts (e.g., R. F. H. Fischer, C. Windpassinger, A. Lamper, and J. B. Huber, "MIMO preceding for decentralized receivers", In proc. ISIT 2002, Lausanne, Switzerland, June 2002 and B. M. Hochwald, C. B. Peel, and A. Lee Swindlehurst, "A vector perturbation technique for near-capacity multiantenna multiuser communication—part II: perturbation", IEEE Trans. Commun. vol. 53, No. 3, pp. 537-544, March 2005), a value which minimizes p is calculated without limiting the absolute value of $l_{k,d}^{(r)}(t)$ and $l_{k,d}^{(i)}(t)$. In the embodiment, a limitation is imposed on the upper limit value of the absolute value of $l_{k,d}^{(r)}(t)$ and $l_{k,d}^{(i)}(t)$ for each wireless communication terminal, and $l_{k,d}^{(r)}(t)$ and $l_{k,d}^{(i)}(t)$ which minimize the transmission power p are decided under this limitation, as described above. Letting $L_k$ be the upper limit value of the absolute value of $l_{k,d}^{(r)}(t)$ and $l_{k,d}^{(i)}(t)$ of the kth wireless communication terminal, the search range of $l_{k,d}^{(r)}(t)$ and $l_{k,d}^{(i)}(t)$ is given by $$-L_k \leq l_{k,d}^{(r)}(t), l_{k,d}^{(i)}(t) \leq L_k \quad (9)$$

The base station 101 receives $L_k$ from each wireless communication terminal together with a connection request. That is, each wireless communication terminal sets $L_k$ and notifies the base station 101 of it. The preceding unit 202 sets $L_k$ for each wireless communication terminal and performs preceding using $L_k$ upon transmission.

However, the embodiment of the present invention is not limited to this. For example, each wireless communication terminal may notify the base station 101 of its allowable power consumption. In this case, the base station 101 decides $L_k$ based on the allowable power consumption of the wireless communication terminal. The higher the allowable power consumption of a wireless communication terminal is, the larger $L_k$ set by the base station 101 is. Alternatively, the wireless communication terminal may notify the base station 101 of necessary communication quality. The base station 101 decides $L_k$ based on the communication quality required by the wireless communication terminal. The higher the communication quality required by a wireless communication terminal is, the larger $L_k$ set by the base station 101 is. Otherwise, the wireless communication terminal may notify the base station 101 of receiving performance. The base station 101 decides $L_k$ based on the receiving performance of the wireless communication terminal. The higher the receiving performance of a wireless communication terminal is, the larger $L_k$ set by the base station 101 is. The wireless communication terminal may notify the base station 101 of all the power consumption, communication quality, and receiving performance, and the base station 101 may decide $L_k$ based on all these factors. The wireless communication terminal may transmit $L_k$ together with the power consumption, communication quality, and receiving performance. Instead of directly using the instruction from the wireless communication terminal, the base station 101 may determine, based on the power consumption, communication quality, and receiving performance, the effectiveness of $L_k$ received from the wireless communication terminal and set final $L_k$. Setting of $L_k$ is done by the upper limit value storage unit 201.

Effects obtained by setting the upper limit value $L_k$ will be described later in detail in association with receiving processing. The upper limit value storage unit 201 stores the values $L_k$.

By applying preceding in the above-described manner, the transmission signal represented by Expression (1) is rewritten as $$y(t) = \sum_{k=1}^{K} \sum_{d=1}^{D_k} v_{k,d} \cdot (s_{k,d}(t) + \tau(I_{k,d}^{(r)}(t) + jI_{k,d}^{(i)}(t))) \qquad (10)$$

Tomlinson Harashima Precoding (to be referred to as THP hereinafter) may be applied as a preceding scheme. In the THP, to prevent the first to (k−1)th wireless communication terminals from receiving a signal to be transmitted to the kth wireless communication terminal, transmission weight vectors are decided to satisfy $$H_n[v_{k,1}\ v_{k,2} \ldots v_{k,D_k}] = 0_{M_n, D_k}, (\forall n < k) \qquad (11)$$

In this scheme, the transmission weight vector to transmit the signal to the kth wireless communication terminal is decided without considering interference to the (k+1)th and subsequent wireless communication terminals. For this reason, the signal transmitted to the kth wireless communication terminal interferes with the (k+1)th and subsequent wireless communication terminals. Similarly, the kth wireless communication terminal receives, as interference signals, signals transmitted to the first to (k−1)th wireless communication terminals. Hence, a signal received by the kth wireless communication terminal is given by $$r_k(t) = H_k \sum_{d=1}^{D_k} v_{k,d} \cdot s_{k,d}(t) + H_k \sum_{m=1}^{k-1} \sum_{d=1}^{D_m} v_{m,d} \cdot s_{m,d}(t) + n_k(t), \qquad (12)$$

$$(\forall k > 1)$$

The second term on the right-hand side of Expression (12) indicates an interference signal for the kth wireless communication terminal. Since the signals are transmitted from the single base station, the base station can estimate the interferences in advance. It is therefore possible to prevent interferences between the wireless communication terminals by adding not only a modulation symbol but also a signal that cancels interference upon receiving to the transmission signal for the kth wireless communication terminal. To obtain the signal to cancel interference in the kth wireless communication terminal, a transmission weight matrix Vk having, as the dth column vector, the transmission weight vector for the dth stream to the kth wireless communication terminal, and a transmission signal vector $s_k(t)$ having, as the dth element, the modulation symbol of the dth stream for the kth wireless communication terminal are used to rewrite Expression (12) as $$r_k(t) = H_k V_k \cdot s_k(t) + H_k \sum_{m=1}^{k-1} V_m \cdot s_m(t) + n_k(t), \qquad (13)$$

$$(\forall k > 1)$$

Let $b_{k,d}(t)$ be the signal added to the dth stream to cancel the interference signal in the receiving signal of the kth wireless communication terminal, and $b_k(t)$ be the interference removing signal vector having $b_{k,d}(t)$ as the dth element. The receiving signal of the kth wireless communication terminal is given by $$r_k(t) = H_k V_k (s_k(t) + b_k(t)) + H_k \sum_{m=1}^{k-1} V_m (s_m(t) + b_m(t)) + n_k(t), \qquad (14)$$

$$(\forall k > 1)$$

The interference removing signal is added for the (k−1)th wireless communication terminal as well.

In Expression (14), $b_k(t)$ is added for the purpose of removing the interference signal in the kth wireless communication terminal. It is necessary to add a signal with which the receiving signal is given by $$r_k(t) = H_k V_k \cdot s_k(t) + n_k(t), (\forall k > 1) \qquad (15)$$

Hence, $b_k(t)$ satisfies $$H_k V_k \cdot b_k(t) + H_k \sum_{m=1}^{k-1} V_m(s_m(t) + b_m(t)) = 0_{M_k, 1} \qquad (16)$$

$$(\forall k > 1)$$

So, $b_k(t)$ is obtained by $$b_k(t) = -(H_k V_k)^{-1} H_k \sum_{m=1}^{k-1} V_m(s_m(t) + b_m(t)) \quad (17)$$

$(\forall k > 1)$

When $b_k(t)$ thus obtained is added, a transmission signal $y_k(t)$ of the kth wireless communication terminal is given by $$y_k(t) = V_k(s_k(t) + b_k(t)), \quad (\forall k > 1) \quad (18)$$

As indicated by Expression (18), the transmission signal power to the kth wireless communication terminal increases by an amount corresponding to the added $b_k(t)$. In this case, a signal is further added by preceding such that the transmission signal power has a predetermined value or less, as in the scheme represented by Expression (5).

$$y_k(t) = \sum_{d=1}^{D_k} v_{k,d} \cdot (s_{k,d}(t) + b_{k,d}(t) + \tau(l_{k,d}^{(r)}(t) + jl_{k,d}^{(i)}(t))) \quad (19)$$

The signal added to each stream by preceding is obtained such that the transmission signal power of each stream has a predetermined value, and therefore satisfies $$l_{k,d}^{(r)}(t) = \arg\min_{l_{k,d}^{(r)}(t)} |s_{k,d}(t) + b_{k,d}(t) + \tau(l_{k,d}^{(r)}(t) + jl_{k,d}^{(i)}(t))|^2 \quad (20)$$

$$l_{k,d}^{(i)}(t) = \arg\min_{l_{k,d}^{(i)}(t)} |s_{k,d}(t) + b_{k,d}(t) + \tau(l_{k,d}^{(r)}(t) + jl_{k,d}^{(i)}(t))|^2 \quad (21)$$

According to the present invention, in the THP scheme as well, the signal to be added by preceding is decided within the range of Expression (9), like the above-described scheme, although it is decided without setting the upper limit value of the signal in the prior arts. As a result, when preceding is applied to the THP scheme, $x_{k,d}(t)$ is given by $$x_{k,d}(t) = (s_{k,d}(t) + b_{k,d}(t) + \tau(l_{k,d}^{(r)}(t) + jl_{k,d}^{(i)}(t)) \quad (22)$$

In the THP scheme, preceding is applied sequentially from the transmission signal to the first wireless communication terminal, as described above. That is, preceding can be applied to either minimize the total transmission power to all wireless communication terminals or sequentially minimize the transmission power as in the THP scheme. Any other scheme is usable as long as the absolute value of the signal to be added by preceding is limited in each wireless communication terminal, and preceding is applied within that range.

Figure 5:
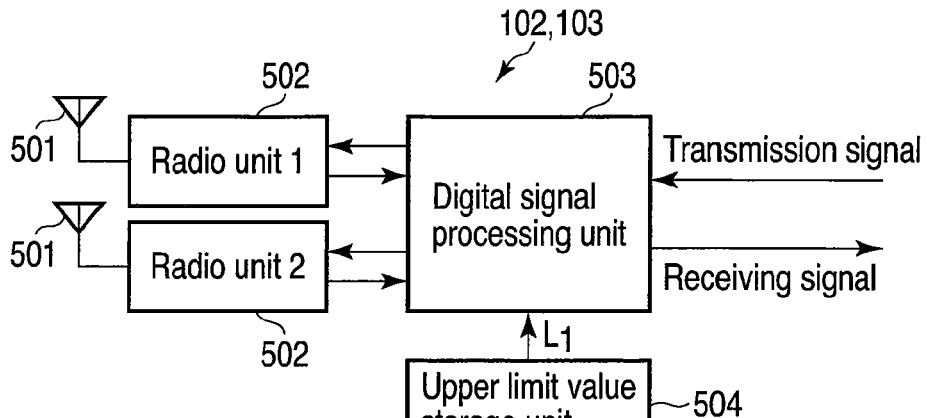
FIG. 5 is a block diagram of the wireless communication terminal in FIG. 1.

The wireless communication terminal according to the embodiment will be described next with reference to FIG. 5. The wireless communication terminal is, e.g., the wireless communication terminal 102 or 103.

The wireless communication terminal 102 or 103 includes antennas 501 (two in the example of FIG. 5), radio units 1 and 2 502 (two in the example of FIG. 5), digital signal processing unit 503, and upper limit value storage unit 504.

The radio units 1 and 2 502 receive a transmission signal from the base station 101 via the antennas 501. The transmission signal is represented by Expression (10). Hence, the kth wireless communication terminal receives a signal given by $$r_k(t) = H_k \sum_{k=1}^{K} \sum_{d=1}^{D_k} v_{k,d} \cdot (s_{k,d}(t) + \tau(l_{k,d}^{(r)}(t) + jl_{k,d}^{(i)}(t))) + n_k(t) \quad (23)$$

Assume that the transmission weight vectors are controlled to prevent a signal transmitted to a specific wireless communication terminal from being received by other wireless communication terminals, as indicated by Expression (3). In this case, the receiving signal of Expression (23) can further be rewritten as $$r_k(t) = H_k \sum_{d=1}^{D_k} v_{k,d} \cdot (s_{k,d}(t) + \tau(l_{k,d}^{(r)}(t) + jl_{k,d}^{(i)}(t))) + n_k(t) \quad (24)$$

That is, the kth wireless communication terminal does not receive signals transmitted to the remaining wireless communication terminals, and can therefore extract $D_k$ streams transmitted to itself by the same scheme as the receiving scheme of conventional single-user MIMO transmission.

The digital signal processing unit 503 performs digital signal processing of the received signal. The digital signal processing unit 503 can employ various schemes as the single MIMO receiving scheme, including the ZF scheme of extracting each stream using the generalized inverse matrix of $H_k$, the MMSE scheme of multiplying a receiving signal by a weight to minimize the root-mean-square value of an error in consideration of noise power, and a scheme of estimating a transmission signal based on maximum likelihood estimation. This embodiment does not limit the MIMO receiving scheme to a specific scheme, and a detailed description thereof will be omitted.

A signal thus extracted includes not only the modulation symbol $s_{k,d}(t)$ but also the signal added by preceding.

$$\tilde{x}_{k,d}(t) = s_{k,d}(t) + \tau(l_{k,d}^{(r)}(t) + jl_{k,d}^{(i)}(t)) + n_{k,m}(t) \quad (25)$$

The upper limit value storage unit 504 stores the upper limit value $L_k$ to be used by the wireless communication terminal. The upper limit value storage unit 504 may store, e.g., the allowable power consumption, necessary communication quality, or receiving performance of the wireless communication terminal in place of $L_k$. Alternatively, the upper limit value storage unit 504 may store the information of the wireless communication terminal, i.e., all the allowable power consumption, necessary communication quality, or receiving performance of the wireless communication terminal.

Otherwise, the base station 101 may set the upper limit value $L_k$ in accordance with the information of the wireless communication terminal sent from it to the base station 101 upon connection request, and transmit, e.g., a broadcast signal or a beacon including the set upper limit value $L_k$ corresponding to the wireless communication terminal. In this case, the wireless communication terminal receives the broadcast signal or beacon, and the upper limit value storage unit 504 receives and stores the upper limit value included in the signal.

Note that $L_k$, allowable power consumption, necessary communication quality, and receiving performance of the wireless communication terminal are sent while being included in a connection request frame transmitted from the wireless communication terminal to the base station 101.

Figure 6:
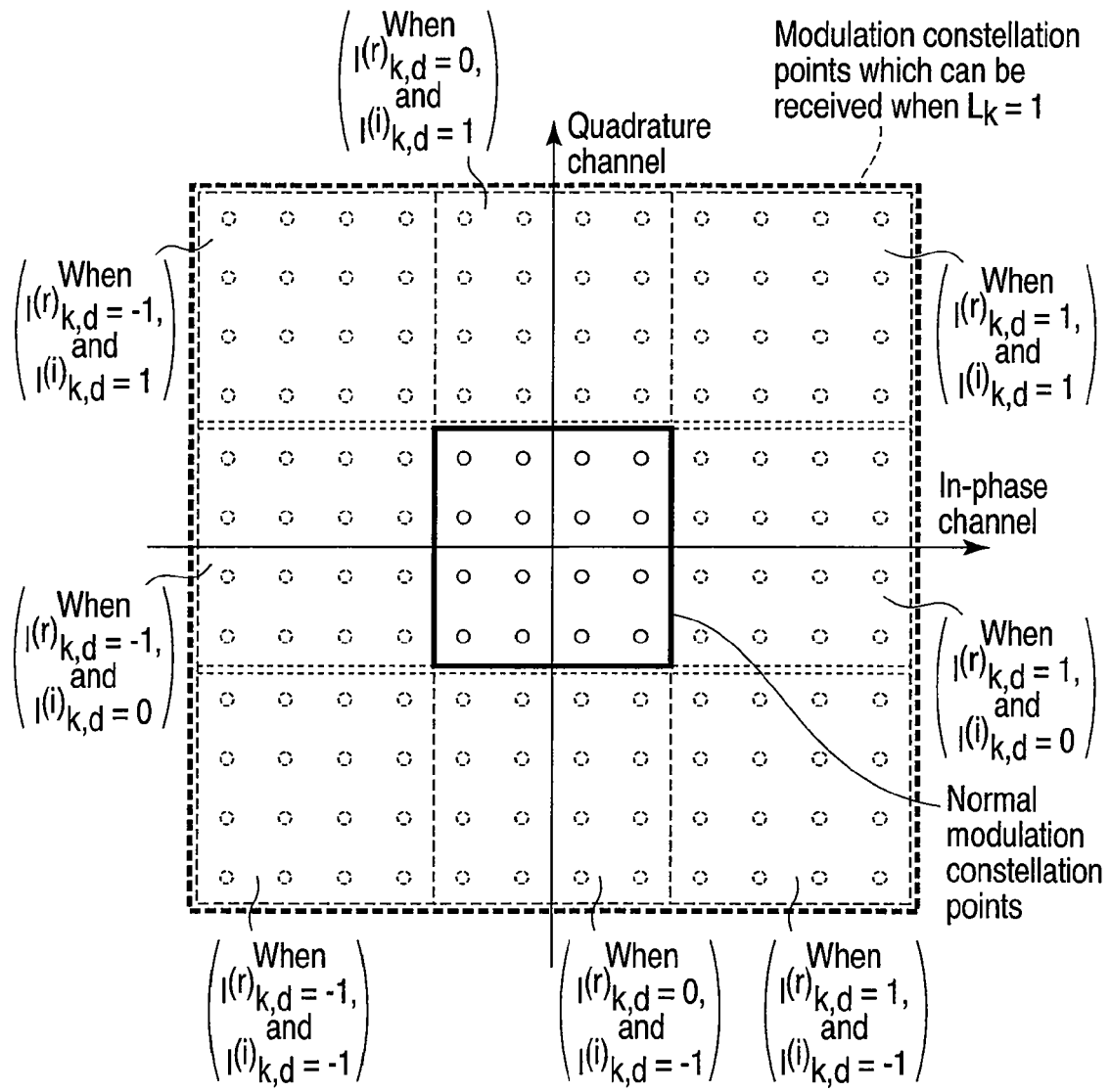
FIG. 6 is a view showing modulation constellation points when the absolute value of a signal added by precoding is 1.

A case will be described next with reference to FIG. 6, in which a signal added by precoding is estimated to estimate a transmitted modulation symbol.

The signal added by precoding is unknown. Hence, the receiver (wireless communication terminal in this embodiment) needs to guess the signal added by precoding from the receiving signal, and estimate the transmitted modulation symbol. FIG. 6 shows examples of constellation points that can be received when $L_k=1$. The receiver can receive a larger signal as compared to a system without precoding. For this reason, when precoding is applied to transmission, the dynamic range required of the receiver widens.

In the conventional precoding scheme, a signal is added by precoding without limitations. A large signal beyond the range in FIG. 6 may be added by precoding, and the magnitude of the added signal is unknown. Hence, the receiver must widen its dynamic range more than necessary. This results in a larger device scale or a wider dynamic range and further leads to an increase in power consumption. When the upper limit value of the absolute value is set for the signal to be added by precoding, as in this embodiment, a dynamic range necessary for receiving the precoded signal by the wireless communication apparatus can be clarified, and this prevents any excess increase in the device scale. If the upper limit value of the signal to be added by precoding is defined uniformly in a system including various kinds of wireless communication terminals such as a wireless communication terminal that gives priority to low power consumption or device size reduction and a wireless communication terminal that gives priority to communication quality but allows an increase in the power consumption or device size to some degree, it may be impossible to meet the quality requirement of every wireless communication terminal.

In this embodiment, however, the upper limit value of the absolute value of the signal to be added by precoding is defined for each wireless communication terminal. This enables to realize precoding according to the device scale of each wireless communication terminal. The upper limit value in each wireless communication terminal defines the range of constellation points receivable by the wireless communication terminal.

As described above, according to the first embodiment, it is possible to apply precoding to multi-user MIMO transmission without increasing the device scale or power consumption of each wireless communication terminal more than necessary. This allows transmission less affected by correlation of propagation paths between wireless communication terminals and thus realizes a higher system throughput.

Setting the upper limit value of a signal to be added by precoding enables a wireless receiver to implement a minimum necessary dynamic range, and prevents any excess increase in the device scale or power consumption.

Additionally, setting the upper limit value for each terminal allows a system including terminals in a variety of forms to improve the system throughput while maintaining an appropriate dynamic range of each terminal.

(Second Embodiment)

A wireless communication apparatus (wireless base station) according to the second embodiment is the same as in the first embodiment in that precoding is applied to multi-user MIMO transmission, and the upper limit value of the absolute value of a signal to be added by precoding is defined for each wireless communication apparatus (wireless communication terminal).

The second embodiment is different from the first embodiment in the method of notifying the upper limit value of the absolute value of a signal that is to be added by precoding and is receivable by each wireless communication terminal. In the first embodiment, each wireless communication apparatus (wireless communication terminal) notifies a base station or an access point of the upper limit value of the absolute value of a receivable precoded signal when transmitting a connection request frame.

In a wireless communication system having many optional functions, a wireless communication terminal must send various values in addition of the upper limit value of precoding upon connection. Examples of the signals are a modulation scheme, coding scheme, coding ratio, the number of streams communicable in MIMO transmission, the upper limit frame value of the frame length, and the communicable frequency bandwidth. In a system which individually sends these signals, the state of a wireless communication terminal can be set in detail. However, this increases the number of signals to be sent at the start of connection, resulting in a large overhead. Additionally, when the number of wireless communication terminals accommodated in a base station or an access point increases, the necessary memory capacity increases if a wireless communication terminal has information in a large amount. Alternatively, conditional branch may be complex in deciding communication parameters in communication, resulting in an increase in the device scale.

The wireless communication system of the embodiment sets a plurality of classes representing the communication parameters of a wireless communication terminal. The parameters of a class include the upper limit value of the absolute value of a signal to be added by precoding. FIG. 7 shows an example of class setting. FIG. 7 illustrates an example in which three classes, i.e., class value 1 (Class1) to class value 3 (Class3) are set. Each class sets a modulation scheme, coding scheme, coding ratio, the number of streams, and the upper limit value of the absolute value of precoding. The upper limit frame value of the frame length and a communicable frequency bandwidth may also be set. In this case, a wireless communication terminal sends only the number of class including itself upon requesting connection. In the example shown in FIG. 7, only two bits are sent. Class values corresponding to the respective wireless communication terminals are stored.

As described above, when the parameters of the class of a wireless communication terminal include the upper limit value of precoding, and the wireless communication terminal sends the class at the time of connection request, the same effects as in precoding upper limit value notification of the first embodiment can be obtained.

As described in the first embodiment, a base station 101 may set an upper limit value $L_k$ in accordance with the class number of a wireless communication terminal, which is sent from it to the base station 101 upon connection request. The base station 101 may transmit, e.g., a broadcast signal or a beacon including the set upper limit value $L_k$ corresponding to the wireless communication terminal. In this case, the wireless communication terminal receives the broadcast signal or beacon, and an upper limit value storage unit 504 receives and stores the upper limit value included in the signal.

A scheme of applying precoding based on the thus received upper limit value of precoding and transmitting signals by multi-user MIMO using beamforming, and a method of estimating a transmission signal from a received signal are the same as in the first embodiment, and a detailed description thereof will not be repeated.

As described above, according to the second embodiment, it is possible to reduce the amount of signals to be sent upon connection request of each wireless communication terminal.

The amount of information of each wireless communication terminal stored in the base station or access point also decreases. This realizes a compact apparatus, improved communication efficiency, and smaller operation amount in transmission and also reduces the power consumption of an apparatus.

It is also possible to apply preceding to multi-user MIMO transmission without increasing the device scale or power consumption of each wireless communication terminal more than necessary. This allows transmission less affected by correlation of propagation paths between wireless communication terminals and thus realizes a higher system throughput.

(Third Embodiment)

A wireless communication apparatus according to the third embodiment is the same as in the first and second embodiments in that preceding is applied to multi-user MIMO transmission, and the upper limit value of the absolute value of a signal to be added by preceding is defined for each wireless communication apparatus.

The third embodiment is different from the first and second embodiments in that it defines a method of causing a wireless communication terminal to notify another base station or access point of the upper limit value of the absolute value of a signal to be added by preceding when performing handover by moving the communication point to the base station or access point.

The operation of this embodiment will be described below with reference to FIG. 8. Referring to FIG. 8, assume that a wireless communication terminal 1 102 communicates with a base station 1 801 and moves in the direction of an arrow.

The receiving power of a radio wave generally attenuates in accordance with the communication distance. Therefore the receiving power from the base station 1 801 decreases as the wireless communication terminal 1 102 moves away from it. Simultaneously, the wireless communication terminal 1 102 moves closer to a base station 2 802, and therefore, the receiving power of a signal transmitted from it gradually strengthens. Similarly, the receiving power of a signal transmitted from the wireless communication terminal 1 102 to the base station 1 801 also gradually weakens while the base station 2 802 receives a stronger signal from the wireless communication terminal 1 102. In general, the channel capacity depends on the receiving power. For this reason, the channel capacity can be larger and the transmission rate can be higher in communication with a base station of high receiving power than in communication with a base station of low receiving power. If the transmission power is controlled to enable signal receiving at a constant receiving power, the wireless communication terminal can reduce the transmission power by communicating with a base station of high receiving power. Hence, a wireless communication terminal driven by a battery can prolong the battery life. It is also possible to reduce interference with adjacent base stations.

That is, if the receiving power has changed along with the movement of a wireless communication terminal during wireless communication, it preferably communicates with a base station of high receiving power. Even at a constant receiving power, if the traffic is heavy because, for example, the base station as a communication partner is communicating with many wireless communication terminals, communication can be done more efficiently with another base station.

Under these circumstances, the wireless communication terminal can raise the communication quality by switching the communication partner to another base station. Switching the communication partner in this way will be referred to as handover hereinafter. Note that handover is done by a wireless communication terminal autonomously or by notification from a base station. Which method should be applied depends on the communication system. In this embodiment, either method is usable.

When performing handover, the base station 2 802 which is going to newly communicate with the wireless communication terminal 1 102 does not hold the information of the wireless communication terminal 1 102. Hence, even when nonlinear preceding is applied to multi-user MIMO transmission, the upper limit value of the absolute value of a signal which is to be added by preceding and is receivable by the wireless communication terminal 1 102 is not known but unknown for the base station 2 802. It is therefore necessary to acquire the information of the wireless communication terminal 1 102 by some means.

In a wireless communication system having a control station (not shown) for controlling each base station, the base station 1 801 transmits the information of the wireless communication terminal 1 102 to the control station, and the control station transmits the information to the base station 2 802. This enables the base station 2 802 to acquire the information of the wireless communication terminal 1 102. This method allows the base station 2 802 to acquire the upper limit value of the absolute value of a signal to be added by preceding.

Even without the control station, if the base stations can somehow communicate with each other, the base station 1 801 can notify the base station 2 802 of the information of the wireless communication terminal 1 102 and the upper limit value of the absolute value of a signal to be added by preceding.

When the base stations exchange information in this way, the base station 2 802 that will start communication with the wireless communication terminal 1 102 can also know the upper limit value of the absolute value of a signal to be added by nonlinear precoding when transmitting a signal to the wireless communication terminal 1 102 using multi-user MIMO transmission.

Upon handover, the wireless communication terminal 1 102 may directly send its information to the base station 2 802 to notify it of the upper limit value of the absolute value of a signal to be added by preceding. Generally, the wireless communication terminal detects a signal transmitted from another base station and searches for the handover destination in both handover based on notification from the base station and handover autonomously executed by the wireless communication terminal. Consequently, the wireless communication terminal transmits a connection request frame to the obtained handover destination. In this case, the wireless communication terminal can notify the base station 2 802 of its information, and therefore transmits the upper limit value of the absolute value of a signal to be added by nonlinear precoding together with the connection request frame. In other words, the wireless communication terminal sends, to the base station to be connected newly, the handover request frame including the upper limit value of the absolute value of a signal to be added by nonlinear preceding. Otherwise, after establishment of connection, the wireless communication terminal may send a notification to the base station 2 802 again.

With the above-described procedure, even when the wireless communication terminal communicates with another base station upon handover, the upper limit value of the absolute value of a signal to be added by nonlinear preceding can be sent to the base station. The base station transmits signals to the wireless communication terminal while setting, based on the obtained information, the absolute value of a signal to be added by nonlinear preceding to a predetermined value or less. A method of causing the wireless communication terminal to receive the thus transmitted signal is the same as in the first and second embodiments, and a detailed description thereof will not be repeated.

As described above, according to the third embodiment, even when each wireless communication terminal communicates with another base station or access point upon handover, it is possible to apply preceding to multi-user MIMO transmission without increasing the device scale or power consumption of the wireless communication terminal more than necessary. This allows transmission less affected by correlation of propagation paths between wireless communication terminals and thus realizes a higher system throughput.

(Fourth Embodiment)

A wireless communication apparatus according to the fourth embodiment is the same as in the first to third embodiments in that preceding is applied to multi-user MIMO transmission, and the upper limit value of the absolute value of a signal to be added by preceding is defined for each wireless communication apparatus.

The fourth embodiment is different from the first to third embodiments in that a base station or an access point transmits signals multiplexed by multi-user MIMO to each wireless communication terminal and a relay station.

An important challenge in designing a wireless communication system is to reduce dead zones for radio waves. In general environments where wireless communication is applied, various kinds of obstacles such as buildings, furniture, and vehicles make it difficult to completely eliminate the dead zones. To reduce the dead zones, dense installation of base stations and access points is necessary. However, the members of base stations and access points cannot be increased unlimitedly because the operation cost rises. In the present situation, a demand for relay communication is expected to grow, in which an inexpensive relay station is installed in a dead zone so that a wireless communication terminal communicates with a base station via the relay station, and vice versa.

FIG. 9 illustrates an example of multi-user MIMO transmission using a relay station. In the example of FIG. 9, a signal to a wireless communication terminal 2 103 is temporarily transmitted to a relay station 901. The relay station 901 transmits the signal to the wireless communication terminal 2 103 via another channel (e.g., time or frequency). In the example of FIG. 9, a base station 101 transmits a signal to a wireless communication terminal 1 102 and that to the relay station 901 simultaneously using multi-user MIMO transmission.

In this case, since the relay station 901 is usually installed in a predetermined place, requirements for both the device scale and power consumption are relaxed in general as compared to a portable terminal that operates on a battery. When applying preceding, the upper limit value of the absolute value of a signal to be added by preceding is set large for the relay station 901, and that for the wireless communication terminal 1 102 is set small. That is, the upper limit value of the absolute value is made larger for a signal to the relay station 901 than for a signal to the wireless communication terminal 1 102. The upper limit value of preceding is thus changed between the relay station 901 and the wireless communication terminal 1 102. This allows each wireless communication terminal to change the upper limit value between wireless communication apparatuses (wireless base stations) without sending the upper limit value of the absolute value of a signal to be added by preceding upon connection request.

Otherwise, each wireless communication terminal may send its upper limit value, as in the first to third embodiments, and the relay station may communicate using a predetermined upper limit value.

A scheme of applying preceding based on the thus received upper limit value of preceding and transmitting signals by multi-user MIMO using beamforming, and a method of estimating a transmission signal from a received signal are the same as in the first embodiment, and a detailed description thereof will not be repeated.

As described above, according to the fourth embodiment, it is possible to reduce the amount of signals to be sent upon connection request of each wireless communication terminal. The amount of information of each wireless communication terminal stored in the base station or access point also decreases. This realizes a compact apparatus, improved communication efficiency, and smaller operation amount in transmission and also reduces the power consumption of an apparatus.

It is also possible to apply preceding to multi-user MIMO transmission without increasing the device scale or power consumption of each wireless communication terminal more than necessary. This allows transmission less affected by correlation of propagation paths between wireless communication terminals and thus realizes a higher system throughput.

(Fifth Embodiment)

A wireless communication apparatus according to the fifth embodiment is the same as in the first to fourth embodiments in that preceding is applied to multi-user MIMO transmission, and the upper limit value of the absolute value of a signal to be added by preceding is defined for each wireless communication apparatus.

The fifth embodiment is different from the first to fourth embodiments in that the signal to be added by preceding is decided for each wireless communication terminal in ascending order of the upper limit value. Note that a method of sending the upper limit value of the absolute value of a signal to be added by preceding in the fifth embodiment is the same as in the first to fourth embodiments, and a detailed description thereof will not be repeated.

In this embodiment as well, a preceding signal which minimizes the power of the transmission signal represented by Expression (10) is decided under an environment to restrict the upper limit value of the absolute value of preceding, like Expression (9), as in the first to fourth embodiments. Expression (10) is rewritten as a matrix.

$$y(t)=V(s(t)+\tau \cdot l(t)) \quad (26)$$

for $$V=[v_{1,1}\ v_{1,2}\ \ldots\ v_{1,D_1}\ v_{2,1}\ \ldots\ v_{2,1}\ \ldots\ v_{2,D_2}\ \ldots\ v_{K,D_K}] \quad (27)$$

$$s(t)=[s_{1,1}(t)s_{1,2}(t)\ \ldots\ s_{1,D_1}(t)s_{2,1}(t)\ \ldots\ {}_{2,D_2}(t)\ \ldots\ s_{K,D_K}(t)]^T \quad (28)$$

$$l(t)=[l_{1,1}^{(r)}(t)\ \ldots\ l_{1,D_1}^{(r)}(t)+jl_{1,D_1}^{(i)}(t)l_{2,1}^{(r)}(t)+jl_{2,1}^{(i)}(t)\ \ldots\ l_{K,D_K}^{(r)}(t)+jl_{K,D_K}^{(i)}(t)]^T \quad (29)$$

Using Expression (26), the transmission signal power is given by $$\|y(t)\|^2 = y^H(t)y(t) \quad (30)$$
$$= (s(t)+\tau \cdot l(t))^H(V^H V)(s(t)+\tau \cdot l(t))$$

When $V^H V$ is expressed using the product of an upper triangular matrix by Cholesky decomposition, the transmission power of Expression (3) can be expanded to $$\|y(t)\|^2 = (s(t) + \tau \cdot l(t))^H (V^H V)(s(t) + \tau \cdot l(t)) \quad (31)$$
$$= (s(t + \tau \cdot l(t)))^H (C^H C)(s(t) + \tau \cdot l(t))$$
$$= \|C(s(t) + \tau \cdot l(t))\|^2$$

where C is the upper triangular matrix. It is therefore possible to recursively obtain the preceding signal based on a signal for the $D_k$th stream of the kth wireless communication terminal.

In this case, the order of deciding the signal to be added by preceding can be controlled by rearranging the column vectors of a matrix V and the elements of s(t) and l(t). In the fifth embodiment, using the fact that the range of signals to be searched in preceding changes between the wireless communication terminals, the rearrangement is done to make it possible to search the signals in ascending order of upper limit value of the absolute value of a signal to be added by preceding. As a result, the number of times of return to a preceding stage in the signal search decreases. This allows to decrease the operation amount of the signal search and suppress process delay.

A signal transmission scheme and receiving scheme after preceding is thus applied are the same as in the first to fourth embodiments, and a detailed description thereof will not be repeated.

As described above, according to the fifth embodiment, it is possible to decrease the signal search operation amount and suppress process delay when applying preceding to multi-user MIMO transmission.

It is also possible to reduce the amount of signals to be sent upon connection request of each wireless communication terminal. The amount of information of each wireless communication terminal stored in the base station or access point also decreases. This realizes a compact apparatus, improved communication efficiency, and smaller operation amount in transmission and also reduces the power consumption of an apparatus.

Additionally, it is possible to apply preceding to multi-user MIMO transmission without increasing the device scale or power consumption of each wireless communication terminal more than necessary. This allows transmission less affected by correlation of propagation paths between wireless communication terminals and thus realizes a higher system throughput.

(Sixth Embodiment)

A wireless communication apparatus according to the sixth embodiment is the same as in the first to fifth embodiments in that preceding is applied to multi-user MIMO transmission, and the upper limit value of the absolute value of a signal to be added by preceding is defined for each wireless communication apparatus.

The sixth embodiment is different from the first to fifth embodiments in that OFDM (Orthogonal Frequency Division Multiplexing) or OFDMA (Orthogonal Frequency Division Multiple Access) is applied as a signal transmission scheme.

When the frequency bandwidth used for communication is expanded to speed up wireless communication, time lags caused by propagation delay in multi-propagation paths become nonnegligible. In an environment where signals with such different propagation delay times arrive, waveform distortion caused by intersymbol interference is a significant factor to deteriorate communication quality. In such an environment, OFDM is known as a scheme capable of compensating for waveform distortion caused by intersymbol interference even upon receiving signals with different propagation delay times. Similarly, OFDMA which performs communication by distributing subcarriers to a plurality of wireless communication terminals, instead of causing one wireless communication terminal to exclusively use all subcarriers, can also easily correct the influence of multi-propagation paths.

When multi-user MIMO transmission is applied to OFDM or OFDMA, beamforming and preceding described in the first to fifth embodiments are applied for each subcarrier, and receiving is also executed for each subcarrier. In this case, the upper limit value of the absolute value of a signal to be added by preceding is set for each wireless communication terminal, and preceding is applied for each subcarrier using the set upper limit value.

Processing other than thus applying beamforming and preceding for each subcarrier and estimating a signal for each subcarrier is the same as in the first to fourth embodiments, and a detailed description thereof will not be repeated.

As described above, according to the sixth embodiment, it is possible to apply preceding to multi-user MIMO transmission without increasing the device scale or power consumption of each wireless communication terminal more than necessary even in a multi-propagation path environment. This allows transmission less affected by correlation of propagation paths between wireless communication terminals and thus realizes a higher system throughput.

It is also possible to reduce the amount of signals to be sent upon connection request of each wireless communication terminal. The amount of information of each wireless communication terminal stored in the base station or access point also decreases. This realizes a compact apparatus, improved communication efficiency, and smaller operation amount in transmission and also reduces the power consumption of an apparatus.

Additionally, according to the sixth embodiment, it is possible to decrease the signal search operation amount and suppress process delay when applying preceding to multi-user MIMO transmission.

According to the above-described embodiments, preceding is applied to multi-user MIMO transmission by defining the upper limit value of the absolute value of a signal to be added by preceding for each wireless communication terminal. This makes is possible to apply preceding to multi-user MIMO transmission without increasing the device scale or power consumption of each wireless communication terminal more than necessary. This also allows transmission less affected by correlation of propagation paths between wireless communication terminals and thus attains a higher system throughput.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus comprising:
   a first storage unit configured to store each of a plurality of upper limit values of absolute values of additional signals that are set for a corresponding one of a plurality of first wireless communication apparatuses and are added when a plurality of modulation symbols to be transmitted to the first wireless communication apparatuses are precoded;

a coding unit configured to decide each of a plurality of first values of the additional signals for a corresponding one of the first wireless communication apparatuses within ranges defined by the upper limit values, and precode the modulation symbols using the first values to obtain a plurality of transmission signals; and a first transmission unit configured to transmit, using multi-user MIMO (Multiple Input Multiple Output), the transmission signals to the first wireless communication apparatuses.

2. The apparatus according to claim 1, further comprising a first receiving unit configured to receive each of the upper limit values for a corresponding one of the first wireless communication apparatuses upon receiving each of a plurality of connection request frames from a corresponding one of the first wireless communication apparatuses.

3. The apparatus according to claim 1, further comprising a second receiving unit configured to receive each of the upper limit values included in a corresponding one of a plurality of first frames sent from the first wireless communication apparatuses to request handover.

4. The apparatus according to claim 1, further comprising a third receiving unit configured to receive each of a plurality of connection request frames from a corresponding one of the first wireless communication apparatuses, and then each of the upper limit values in a corresponding one of frames different from the connection request frames.

5. The apparatus according to claim 1, further comprising a fourth receiving unit configured to receive each of a plurality of first frames sent from a corresponding one of the first wireless communication apparatuses to request handover, and then each of the upper limit values in a corresponding one of second frames different from the first frames.

6. The apparatus according to claim 1, further comprising:

a setting unit configured to set, as a plurality of class values, each of a plurality of classes with different communication parameters each including a corresponding one of the upper limit values and at least corresponding one of a modulation scheme, a coding scheme, a coding ratio, the number of communicable streams, an upper limit frame value of a frame length, and a communicable frequency bandwidth; and a fifth receiving unit configured to store each of the class values for a corresponding one of the first wireless communication apparatuses, and receive, for each of the first wireless communication apparatuses, the class value for a corresponding one of the first wireless communication apparatuses.

7. The apparatus according to claim 6, wherein the fifth receiving unit receives each of the class values for a corresponding one of the first wireless communication apparatuses upon receiving each of a plurality of connection request frames from a corresponding one of the first wireless communication apparatuses.

8. The apparatus according to claim 6, wherein the fifth receiving unit receives each of the class values included in a corresponding one of a plurality of first frames sent from the first wireless communication apparatuses to request handover.

9. The apparatus according to claim 6, wherein the fifth receiving unit receives each of a plurality of connection request frames from a corresponding one of the first wireless communication apparatuses, and then each of the class values in a corresponding one of the first wireless communication apparatuses in a corresponding one of frames different from the connection request frames.

10. The apparatus according to claim 6, wherein the fifth receiving unit receives each of a plurality of first frames sent from a corresponding one of the first wireless communication apparatuses to request handover, and then each of the class values in a corresponding one of second frames different from the first frames.

11. The apparatus according to claim 1, wherein the coding unit decides each of the first values in ascending order of upper limit value.

12. A wireless communication apparatus comprising:

a first storage unit configured to store each of a plurality of upper limit values of absolute values of additional signals to be added upon precoding, each of the upper limit values defining a corresponding one of ranges each indicating constellation points corresponding to receivable signals; and a first transmission unit configured to transmit, before a second wireless communication apparatus transmits a plurality of signals to a plurality of first wireless communication apparatus using multi-user MIMO (Multiple Input Multiple Output), a corresponding one of the upper limit values to the second wireless communication apparatus.

13. The apparatus according to claim 12, further comprising a second transmission unit configured to transmit a corresponding one of the upper limit values to a fourth wireless communication apparatus upon handover from the second wireless communication apparatus to the fourth wireless communication apparatus which is different from the second wireless communication apparatus and transmits signals to a plurality of third wireless communication apparatuses.

14. The apparatus according to claim 12, wherein the fourth wireless communication apparatus stores, as a plurality of class values, each of a plurality of classes with different communication parameters each including a corresponding one of the upper limit values and at least corresponding one of a modulation scheme, a coding scheme, a coding ratio, the number of communicable streams, an upper limit frame value of a frame length, and a communicable frequency bandwidth, and further comprising:

a second storage unit configured to store, out of the class values, a class value corresponding to a self wireless communication apparatus; and a third transmission unit configured to transmit the class value to the fourth wireless communication apparatus upon handover from the second wireless communication apparatus to the fourth wireless communication apparatus which is different from the second wireless communication apparatus and transmits signals to a plurality of third wireless communication apparatuses.

15. A wireless communication system including a plurality of first wireless communication apparatuses and a second wireless communication apparatus, each of the first wireless communication apparatuses comprising:

a second storage unit configured to store an upper limit value of an absolute value of an additional signal to be added when a modulation symbol to be transmitted from the second wireless communication apparatus to each of the first wireless communication apparatuses is precoded, the upper limit value defining a range indicating constellation points corresponding to receivable signals; and a second transmission unit configured to transmit, before the second wireless communication apparatus transmits a plurality of signals to the first wireless communication apparatus using multi-user MIMO (Multiple Input Multiple Output), the upper limit value to the second wireless communication apparatus, and the second wireless communication apparatus comprising:

a first receiving unit configured to receive the upper limit value corresponding to each of first wireless communication apparatuses to obtain each of a plurality of upper limit values for a corresponding one of first wireless communication apparatuses;

a first storage unit configured to store the upper limit values;

a coding unit configured to decide each of a plurality of first values of additional signals for a corresponding one of the first wireless communication apparatuses within ranges defined by the upper limit values, and precode, using the first values, modulation symbols to be transmitted to the first wireless communication apparatuses to obtain a plurality of transmission signals; and a first transmission unit configured to transmit, using multi-user MIMO (Multiple Input Multiple Output), the transmission signals to the first wireless communication apparatuses.

16. A wireless communication method comprising:

storing in a first storage unit each of a plurality of upper limit values of absolute values of additional signals that are set for a corresponding one of a plurality of first wireless communication apparatuses and are added when a plurality of modulation symbols to be transmitted to the first wireless communication apparatuses are precoded;

deciding each of a plurality of first values of the additional signals for a corresponding one of the first wireless communication apparatuses within ranges defined by the upper limit values;

precoding the modulation symbols using the first values to obtain a plurality of transmission signals; and transmitting, using multi-user MIMO (Multiple Input Multiple Output), the transmission signals to the first wireless communication apparatuses.

17. A computer readable storage medium having embedded therein computer executable instructions, wherein the instructions, when executed by a processor, cause the processor to perform a method comprising:

storing in a first storage unit each of a plurality of upper limit values of absolute values of additional signals that are set for a corresponding one of a plurality of first wireless communication apparatuses and are added when a plurality of modulation symbols to be transmitted to the first wireless communication apparatuses are precoded;

deciding each of a plurality of first values of the additional signals for a corresponding one of the first wireless communication apparatuses within ranges defined by the upper limit values;

precoding the modulation symbols using the first values to obtain a plurality of transmission signals; and transmitting, using multi-user MIMO (Multiple Input Multiple Output), the transmission signals to the first wireless communication apparatuses.

* * * * *